May 18, 1948.  R. McDANIEL  2,441,642
MEANS FOR APPLYING LUBRICATING GREASE TO SHAFTS
Filed Feb. 7, 1944
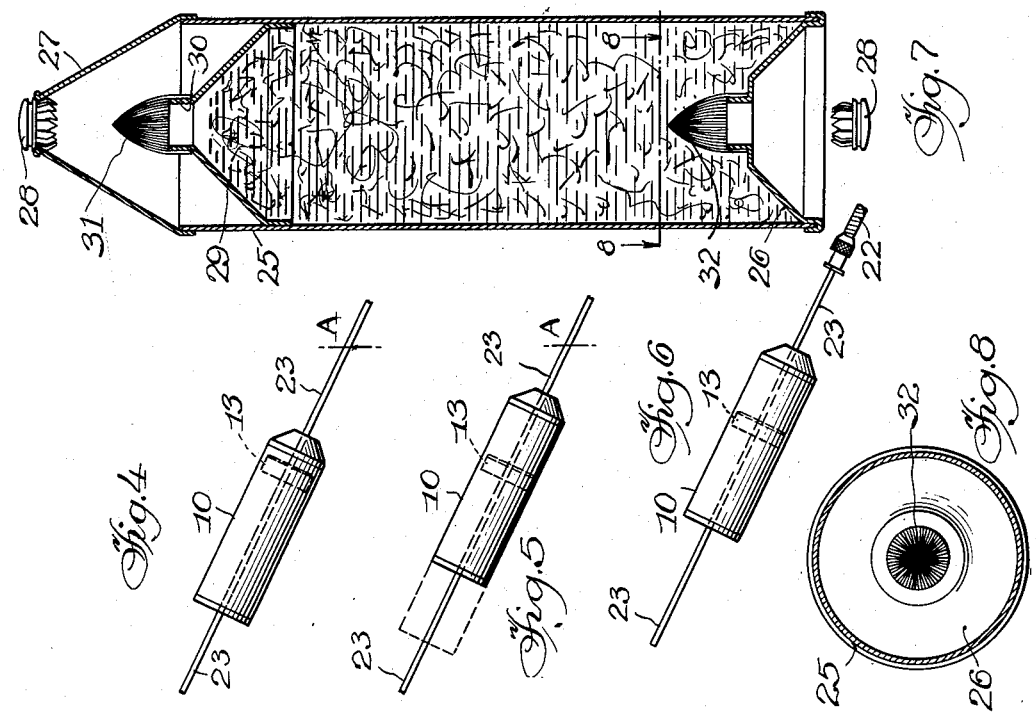
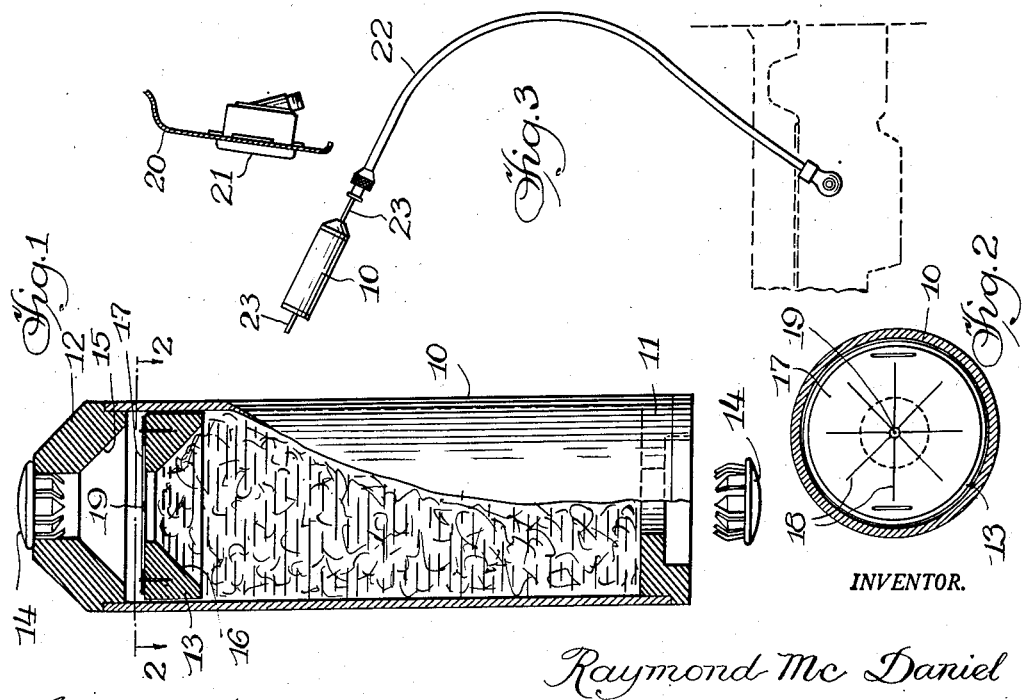
INVENTOR.
Raymond Mc Daniel
Chritten, Wiles, Davies, Schroeder & Merriam, Attys Patented May 18, 1948

2,441,642

UNITED STATES PATENT OFFICE 2,441,642

MEANS FOR APPLYING LUBRICATING GREASE TO SHAFTS

Raymond McDaniel, Los Angeles, Calif., assignor to F. W. Stewart Manufacturing Corporation, a corporation of Illinois Application February 7, 1944, Serial No. 521,339

5 Claims. (Cl. 91—62.5)

1

This invention relates to means for applying lubricating grease to the flexible shaft or cable of a speedometer or like instrument.

A speedometer cable rotates in a flexible tubular casing which leads to the rear of the instrument panel of an automobile. It may be detached from the speedometer and the cable pulled out of its casing to lubricate it after driving a certain distance. Such application of lubricant is usually neglected, due to the difficulty of making an application of a uniform covering of a highly viscous grease over the entire length of the cable. As a result the flexible driving means wears out much sooner than it should and has to be replaced.

The general object of the invention is to provide a container for lubricating grease by means of which the lubricant can be applied to a flexible shaft conveniently and in a cleanly manner, with only a slight soiling of the fingers of one hand.

Another object is to provide an improved method of applying to a shaft or rod the most desirable type of lubricant, not easily applied by conventional methods.

A contributory object is to provide a container having lubricating grease therein of a highly viscous nature, and having an opening at each end through which the flexible shaft may be pushed, entering at one end and passing out at the distant end and through an opening in a piston in said container, thus picking up the proper amount of grease.

Another object is to provide a container having a funnel-shaped entrance and a funnel-shaped exit at opposite ends and a slidable transverse partition therein having an opening aligned with an opening in each of said ends, said transverse partition having means surrounding the opening therein for wiping off surplus grease from a longitudinal member as it is being pushed through said container.

A further object is to provide a container of this character in which the entrance opening is surrounded with suitable means which act as a wiper or brush, removing any foreign matter adhering to the longitudinal member, before coming in contact with the lubricant.

An additional object is to provide a grease container of this character which may be constructed of cheap materials, so that it may be discarded after the lubricating grease therein has been fully used.

Other objects and advantages will be apparent from the description hereinafter given.

The article is constructed preferably of metal, but in one of the two forms illustrated in the drawing it is shown as made of cardboard and wood, due to the necessity of economizing in the use of metal.

Fig. 1 is a sectional elevation of the device with the small closure for the bottom opening removed from but adjacent said opening;

Fig. 2 is a section taken on the line 2—2 of Fig. 1;

Fig. 3 is a somewhat diagrammatic showing on a small scale of part of an automobile panel with a speedometer thereon and the tubular casing disconnected from the speedometer and having the lubricating device applied thereto;

Figs. 4, 5 and 6 illustrate three steps in the operation of applying lubricant to the flexible cable;

Fig. 7 is a sectional elevation of a modified form of the device in which the parts are made of metal, and with the bottom closure removed; and Fig. 8 is a top view of the slidable partition therein.

Referring to Fig. 1, which like Figs. 7 and 8, is on a larger scale than the remaining figures, the grease container indicated generally by reference 10 may be of cylindrical form, consisting of a tubular cardboard member 10 having end closures 11 and 12, made of wood and fitted therein. The cylinder may be charged with a suitable lubricating grease. A transverse slidable partition 13 or piston is introduced into the container on top of the grease before the upper end closure is secured in position.

Each end closure has a central opening therein, which is closed normally by a removable cap 14, the bottom opening constituting the entrance end and the top opening comprising the exit. This closure 12 has a tapering or funnel-shaped inner wall 15, and the outer wall also may be cone-shaped. The slidable partition 13 also has a central opening which constitutes preferably the exit of the funnel-shaped wall 16. Said opening is preferably in alignment with the end openings and is surrounded by fingers of resilient material which may be formed in any one of a number of different ways. For example, said transverse partition may have a disk of fibrous material, such as stiff paper 17, secured thereto in any suitable manner. Said disk is provided with radial slits 18 terminating in a central opening 19 which is preferably smaller than the opening in said partition. If a longitudinal member, such as a flexible cable of slightly larger diameter than the opening between the resilient fingers, is pushed through this partition, said fingers are lifted somewhat above the surface of said disk and act as wipers to remove the surplus grease from said member.

Referring to Fig. 3, the panel or instrument board 20 of an automobile is shown somewhat diagrammatically with a speedometer 21 mounted on one side, from which the flexible sheath 22 leads to some rotating part of the automobile. The flexible cable 23 is normally housed within this tubular casing with a slight clearance between the two. Said casing is shown disconnected from a coupling part behind the instrument board and pulled rearwardly to a convenient position, to illustrate the method of using the device.

The flexible cable 23 is first pulled completely out of its casing or housing 22, and the lower end thereof is then pushed through the grease container, entering at what has been referred to as the lower end and sliding out through the opening in the upper end. In pushing it through the container the cable, or longitudinal member as it may be termed, is guided to the middle opening in the transverse partition by the cone-shaped under surface and in like manner, the end of said member is guided through the closure 12 by the funnel-shaped under surface 15.

As shown in Figs. 4, 5 and 6, after the longitudinal member has been pushed through said container until a substantial part of its length protrudes from the other end, said end is slid into the open end of the tubular housing 22. The container is then held in one hand, preferably in inclined position, and the grease-coated protruding end is grasped between the thumb and finger of the other hand, as for example at the point A. With said longitudinal member held in this position the container 10 is then slid back along the longitudinal member a certain distance, causing it to protrude further, and then pushed forwardly again. At the end of the backward movement the transverse partition or piston 13 is at or near the right-hand or lower end of the container, the space behind it being more or less filled with grease, particularly when the device is used for the first time. The container is then pushed forwardly, whereupon the frictional grip of the resilient fingers on the longitudinal member, tends to push said piston back from the exit end toward the bottom and thus compresses the grease behind it to a slight extent. In pushing the longitudinal member through the container initially there is a tendency to enlarge somewhat the opening in the plug of grease through which said member slides. This compressing action of the piston, as illustrated in Fig. 5, has the effect of compacting the grease around said longitudinal member, so as to eliminate any clearance between it and the grease. The operator then releases his hold at point A and the device is pushed forward further, the effect of which is to cause the longitudinal member to slide further into its tubular casing 22. During this forward movement, the resilient fingers 19 act somewhat as a clutch which grips said member when moving in one direction but not in the other.

The next step is to seize the wire again at another point not far from the exit end of the container, slide the container back along the wire and then push it forward again, repeating the previous operation. Thus said longitudinal member is pushed completely into its housing by a series of forward and downward movements until only a small part of it projects at the upper end. If necessary, this upper end may then be rotated by hand, so that its lower end fits into and enters a noncircular recess (not shown) at the lower end of said housing, thus reestablishing the driving connection. The upper end of the housing and of the cable are then connected to the rear side of the speedometer 21, completing the cycle of operations.

This use of the container withdraws a certain proportion of the grease therefrom, distributing it throughout the length of the cable in a thin uniform layer suitable to provide sufficient lubrication for a period corresponding to perhaps five thousand miles of driving. When that additional mileage has been reached the cable may again be withdrawn and greased again, the container, if large enough, having sufficient capacity to provide for a number of greasing operations by the car owner. Or, if the device is used by a filling station operator, it would have sufficient capacity to grease the flexible speedometer cables of a considerable number of different cars, and, being of cheap construction, said container may then be discarded.

The small closures or buttons 14 with resilient fingers which snap into the openings in the bottom and top of the container, are desirable in that they prevent the grease from hardening by too much exposure to the air.

In the modification shown in Figs. 7 and 8, which is the preferred form, the device is made of metal having, for example, a cylindrical wall 25 and conical metal ends 26, 27 with removable closures or buttons 28 in the top and bottom openings. The conical piston or transverse partition 29 is adapted to slide back and forth within the container, and at the exit end is provided with an extension 30 having a plurality of inclined wire bristles or the like 31 arranged radially when seen in plan view, as in Fig. 8. These bristles form a brush with a small central opening through which the longitudinal member is pushed and which serve not only to wipe off the surface grease, as in the case previously described, but serve also to increase the friction on the wire when it is being pushed into its flexible casing.

The bottom closure 26 is also provided with a wiper 32 surrounding the opening therein, which wiper may be of the same detailed construction as the wiper 31. In fact the bottom closure and the slidable piston 29 may be identical in detailed construction. The bottom wiper seals the bottom opening when pressure is exerted on the upper side of said piston, and thus prevents loss of grease through the bottom opening. Also it acts somewhat like a clutch to grip the longitudinal member when it is being forced into its housing 22. When pressure is exerted on the under side of the piston there is a tendency to release the resilient members which form the wiper and to saturate the latter with grease. This same pressure has the opposite effect on the wiper surrounding the bottom opening, the tendency being to grip the longitudinal member more firmly and seal the opening. For this reason the forward feeding action on the longitudinal member is largely done by the resilient fingers surrounding the bottom opening, rather than by those surrounding the opening in the piston. Another important function of the bottom wiper is that it removes all dirt and foreign matter from the longitudinal member before it enters the lubricator, as for example, solidified grease, grit and the like.

The container in its preferred form is filled preferably with a lubricant of a highly viscous nature, best suited for flexible shaft lubrication, and which lubricant is not commonly obtainable.

Although the device has been described as adapted particularly for lubricating the cable of a speedometer, it is not limited to such use, but is adapted for lubricating cables for tachometers, industrial equipment using small diameter cables and other types of apparatus.

I claim as my invention:

1. A lubricating device comprising, a container for grease having a funnel-shaped inner wall terminating in an opening, the other end also having an opening therein, a slidable partition in said container also having an opening therein, and means surrounding the opening in said slidable partition for wiping excess grease from a longitudinal member passed through said opening and through the openings in the ends of said container.

2. A lubricating device comprising, a container for grease having cone-shaped end closures with aligned openings therein, a slidable piston in said container having an opening aligned with said end openings and resilient members mounted radially around said piston opening to partially obstruct the same.

3. A device as in claim 2, in which said piston has a cone-shaped wall leading to the opening therein, said resilient radial members being arranged in cone-shaped formation also.

4. A device as in claim 2 in which the opening at the entrance end of said container is provided with resilient members in the form of a wiper surrounding said opening, whereby foreign matter may be removed from a longitudinal member forced therethrough.

5. Means for lubricating a speedometer cable or the like, comprising an elongate container, a transverse partition slidably mounted therein dividing the interior of said container into two compartments, the ends of said container and said partition having aligned openings therein, one of said compartments being adapted to hold a body of viscous lubricating material, and clutch means on said partition for gripping a speedometer cable or the like to prevent movement thereof from the empty compartment toward the compartment containing said lubricating material, whereby reciprocation of said lubricating device will lubricate and advance said cable step by step.

RAYMOND McDANIEL.

REFERENCES CITED

The following references are of record in the file of this patent:

UNITED STATES PATENTS

| Number | Name | Date |
|---|---|---|
| 1,471,583 | Andersen | Oct. 23, 1923 |
| 2,199,067 | Bradt | Apr. 30, 1940 |
| 2,207,487 | Kirkpatrick | July 9, 1940 |
| 2,218,482 | Reevely | Oct. 15, 1940 |
| 2,228,341 | Cawthon et al. | Jan. 14, 1941 |
| 2,251,699 | Banschbach | Aug. 5, 1941 |
| 2,370,314 | Jenner | Feb. 27, 1945 |

OTHER REFERENCES

Ser. No. 441,151, Windschauer (A. P. C.) pub. May 4, 1943.